United States Patent [19]

Gulczynski

[11] Patent Number: 4,947,308
[45] Date of Patent: Aug. 7, 1990

[54] HIGH POWER SWITCHING POWER SUPPLY

[76] Inventor: Zdzislaw Gulczynski, P.O. Box 441, Winchester, Mass. 01890

[21] Appl. No.: 338,327

[22] Filed: Apr. 17, 1989

[51] Int. Cl.⁵ .......................................... H02M 3/335
[52] U.S. Cl. ....................................... 363/16; 363/97; 363/37
[58] Field of Search ................. 363/16, 17, 20-21, 363/24-26, 98, 132, 133-134, 37, 97, 131; 323/268, 271, 272

[56] References Cited

U.S. PATENT DOCUMENTS

| | | | |
|---|---|---|---|
| 4,184,197 | 1/1980 | Cuk et al. | 363/16 |
| 4,353,112 | 10/1982 | Rietveld et al. | 363/16 |
| 4,535,399 | 8/1985 | Szepesi | 363/16 |
| 4,736,151 | 4/1988 | Dishner | 363/16 |

Primary Examiner—Peter S. Wong

[57] ABSTRACT

The switching power supply has a high output power and high efficiency. This is accomplished by successively applying voltages of opposite polarities across primary of a power transformer, wherein only two transistors are used. The input voltage may be AC or DC. The switching power supply comprises a capacitor coupled to ground for storing a DC voltage having an opposite polarity to the input voltage. A pair of switches successively applies the input voltage and DC voltage to a node. A transformer has a first winding coupled to the node and ground, a second winding coupled to ground for providing a charging signal and a third winding for providing the output signal. A diode applies the charging signal to the capacitor.

8 Claims, 3 Drawing Sheets

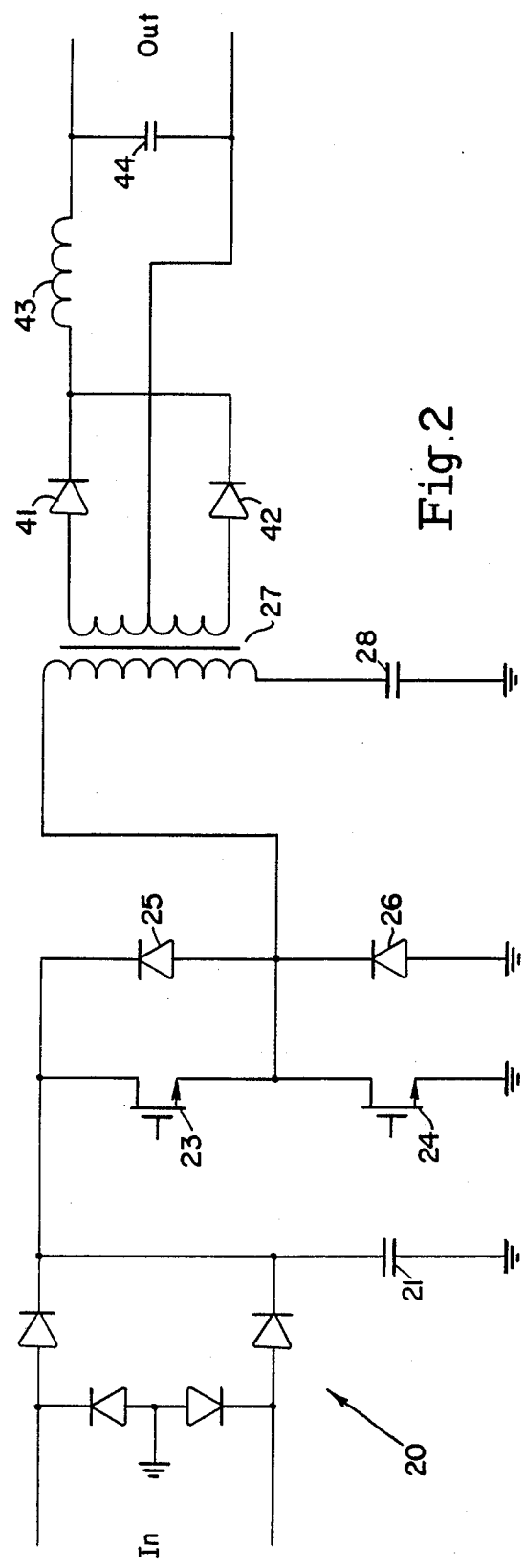
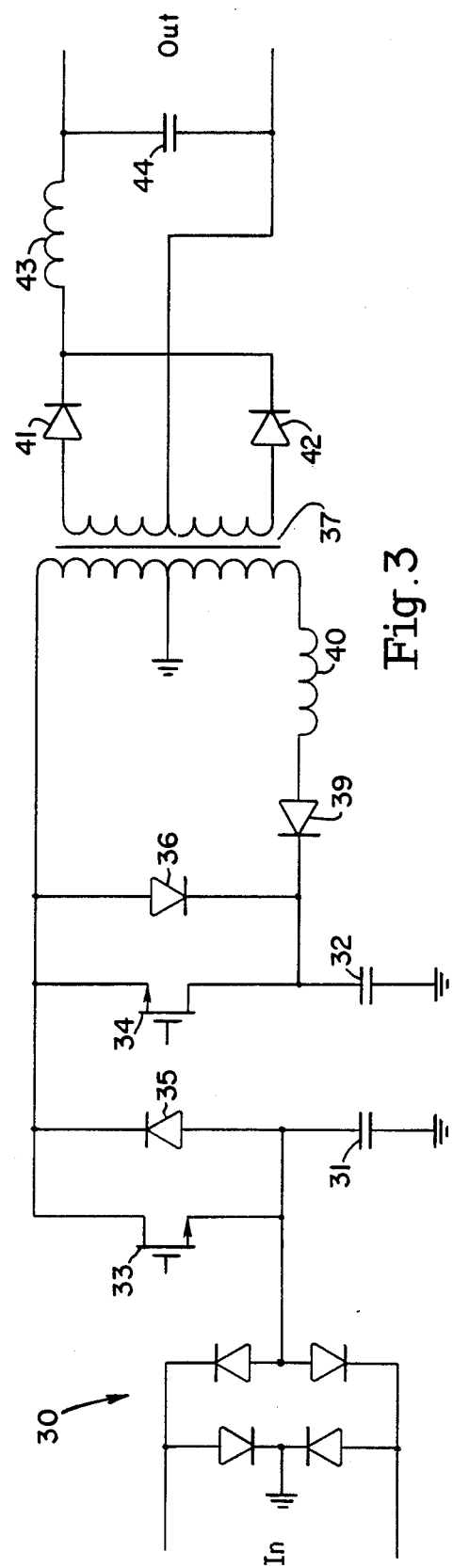
Fig.2
Fig.3

HIGH POWER SWITCHING POWER SUPPLY

CROSS REFERENCE TO RELATED INVENTIONS

This application is related to:
"Capacitive Load Driver with Binary Output" Ser. No. 474,488 filed 02/02/90;
3-Terminal Bidirectional Switching Power Supply with AC or DC Input and AC or DC Output" Ser. No. 444,729 filed 12/01/89;
"Switching Power Supply with Constant or Sinusoidal Input Current and with Fixed or Variable Output Voltage" Ser. No. 444,730 filed 12/01/89;
"Switching Power Supply with Constant or Sinusoidal Input Current" Ser. No. 393,391 filed 08/14/89;
"Switching Power Supply Comprising Pair of Converters for Obtaining Constant or Sinusoidal Input Current and Fixed or Variable Output Voltage" Ser. No. 393,392 filed 08/14/89;
"Ultra Efficient Switching Power Amplifier" Ser. No. 363,213 filed 06/08/89;
"Synchronous Switching Power Supply Comprising Buck Converter" Ser. No. 363,325 filed 06/08/89;
"Synchronous Switching Power Supply Comprising Boost or Flyback Converter" Ser. No. 363,326 filed 06/08/89;
"Synchronous Switching Power Supply with Boost and/or Flyback Converters" Ser. No. 363,327 filed 06/08/89;
"High Efficiency Power Factor Correction Circuit" Ser. No. 338,328 filed 04/17/89 herewith;
"High Power Switching Power Supply with High Power Factor" Ser. No. 304,508 filed 01/31/89;
"High Power Switching Power Supply Having High Power Factor" Ser. No. 304,509 filed 01/31/89;
"Power Switch Driver" Ser. No. 229,914 filed 08/08/88;
"Synchronous Switching Power Supply with Flyback Converter" U.S. Pat. No. 4,853,837 dated 08/01/89;
"High Efficiency Power Amplifier Comprising Multilevel Power Supply" U.S. Pat. No. 4,871,980 dated 10/03/89;
"Switching Power Amplifier" U.S. Pat. No. 4,763,080 dated 08/09/88;
"Switching Circuits Performing Thyristor and Triac Functions" U.S. Pat. No. 4,845,391 dated 07/04/89;
"Switching Power Supply" U.S. Pat. No. 4,803,610 dated 02/07/89; and
"Switching Power Supply" U.S. Pat. No. 4,736,286 dated 04/05/88.
All inventions are by the same inventor.

BACKGROUND OF THE INVENTION

The invention relates to switching power supply (SPS) receiving AC line voltage or DC voltage, particularly for power supply systems requiring high output power and high efficiency.

Half bridge SPS is capable of providing high output power and has high efficiency. In particular, voltages of opposite polarities are successively applied across a single primary winding of a power transformer, wherein only two transistors are employed. An input voltage is stored in a pair of capacitors coupled in series, whereby an effective capacitance is halved. Moreover, a ratio of voltages stored in the capacitors depends on the capacitance ratio thereof. Values of the capacitors are unequal and therefore voltages stored therein have unequal values. Adequate switching times of the transistors must be considered in order to reduce flux symmetry problems and avoid transformer saturation. The imbalance in operating flux level is further reduced by a capacitor which is coupled in series with the primary and must sustain AC voltage and high current.

SUMMARY OF THE INVENTION

The present invention is intended to provide an SPS having a high output power and high efficiency. This is accomplished by successively applying voltages of opposite polarities across primary of a power transformer, wherein only two transistors are used. The input voltage may be AC or DC.

Only one input capacitor is employed. Another capacitor stores a DC voltage. In one embodiment the DC voltage is substantially equal half the input voltage, wherein the capacitor may have a small value. In another embodiment the DC voltage has an opposite polarity to the input voltage in order to effectively increase it. The primary is coupled to ground so that transformer current, including short circuit current, can be easy monitored.

In one embodiment the SPS converts input signal into output signal and comprises a node, a switching means for alternatively coupling the node to the input signal or ground, a capacitive means for storing a DC voltage, and an inductive means for providing the output signal, wherein the capacitive and inductive means are coupled in series between the node and ground.

SPS according to the present invention converts input voltage into output signal and comprises a node, a capacitive means coupled to ground for storing a DC voltage having an opposite polarity to the input voltage, a switching means for alternatively coupling the node to the input voltage or DC voltage, an inductive means coupled to the node and ground for providing a charging signal and the output signal, and a rectifying means for applying the charging signal to the capacitive means.

BRIEF DESCRIPTION OF THE DRAWINGS

The present invention will become more clear in conjunction with the accompanying figures throughout which similar references may denote similar parts and of which:

FIG. 2 is the embodiment of high power SPS;
and
FIG. 3 is the embodiment of high power SPS according to the present invention with transformer having primary with grounded tap, e.g. center-tap.

DETAILED DESCRIPTION OF THE INVENTION

Figure 1:
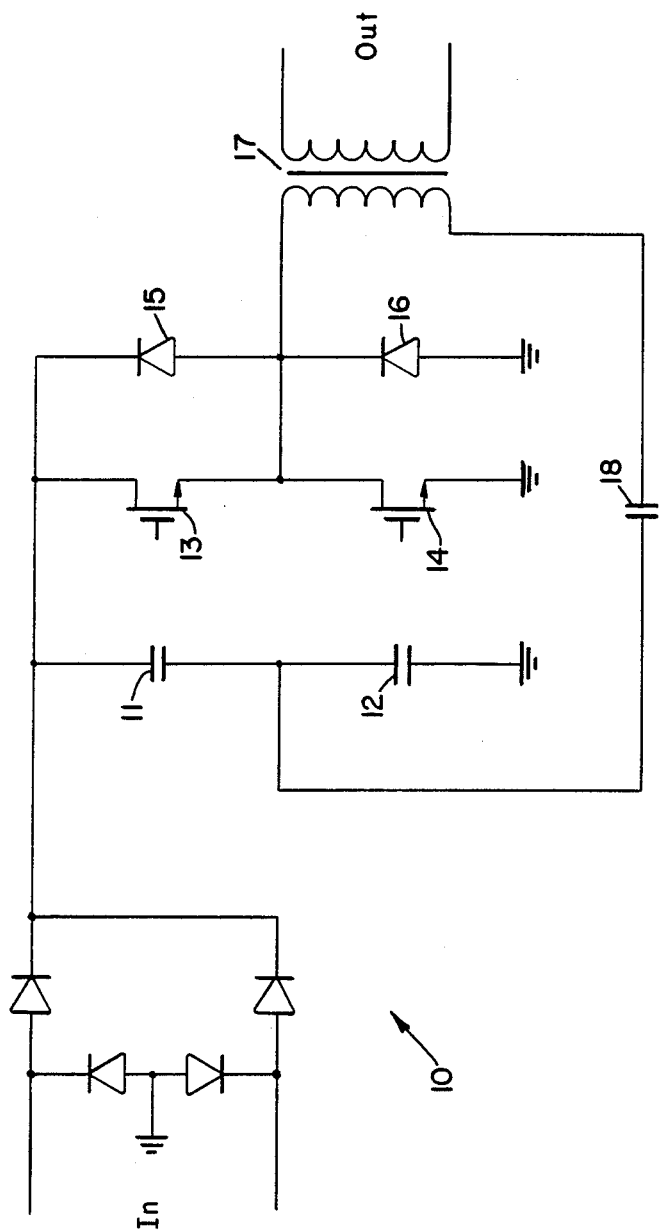
FIG. 1 is the embodiment of the ordinary half bridge SPS.

FIG. 1 is the embodiment of the ordinary half bridge SPS. The input voltage is AC, e.g. line voltage. The diode bridge 10 is coupled in series with line for obtaining a fully rectified positive voltage. The capacitors 11 and 12 are coupled to a first node and are further separately coupled to the rectified voltage and ground respectively. Similarly, two switches are coupled to a second node and are further separately coupled to the rectified voltage and ground. Specifically, one switch consists of the n-channel MOSFET 13 and diode 15 coupled in parallel therewith. The other switch consists of the n-channel MOSFET 14 and diode 16 coupled in parallel therewith.

The transformer 17 has the primary coupled between the first and second nodes. By these means, voltages of opposite polarities are successively applied across the primary. Only one of the transistors 13 or 14 is on at a time. Specifically, the voltage stored in the capacitor 11 or 12 is applied across the primary when the transistor 13 or 14 is turned on respectively. The transformer 17 has the secondary electromagnetically coupled to the primary for providing an output signal of the SPS.

The capacitors 11 and 12 are coupled in series between the rectified voltage and ground. The capacitors 11 and 12 are intended to store voltages each equal half the peak value of the line voltage. However, values of the capacitors 11 and 12 are unequal and therefore voltages stored therein have unequal values. Adequate switching times of the transistors 13 and 14 must be considered in order to reduce flux symmetry problems and avoid transformer saturation. The imbalance in operating flux level is further reduced by the optional capacitor 18 coupled in series with the primary. The capacitor 18 must sustain AC voltage and high current.

FIG. 2 is the preferred embodiment of high power SPS. The input voltage is AC, e.g. line voltage. The diode bridge 20 is coupled in series with line for obtaining a fully rectified positive voltage. A switching means alternatively couples a node to the rectified voltage or ground. A capacitive means stores a DC voltage. An inductive means provides an output signal of the SPS. The capacitive and inductive means are coupled in series between the node and ground. The order of the series connection can be reversed.

The capacitor 21 is coupled to the rectified voltage and ground for storing the peak vale of the line voltage. The switching means includes a pair of switches coupled to the node and further separately coupled to the rectified voltage and ground. Specifically, one switch consists of the n-channel MOSFET 23 and diode 25 coupled in parallel therewith. The other switch consists of the n-channel MOSFET 24 and diode 26 coupled in parallel therewith. The source and drain of the transistors 23 and 24 respectively are coupled to the node. The diodes 25 and 26 prevent reverse currents in the respective transistors and any voltage spikes at the node.

The capacitor 28 and primary of the transformer 27 are coupled in series, i.e. in either order, between the node and ground. The currents flowing thru the transistors 23 and 24 are applied to the capacitor 28 and have opposite polarities. Accordingly, the capacitor 28 is charged and discharged, whereby DC current flowing therethrough is equal zero. The capacitor 28 is charged only once to the nominal voltage, prior to the normal operation of the SPS. Specifically, when the supply first turns on, the transistor 23 is switching while the transistor 24 is turned off. As a result, the capacitor 28 is charged to substantially half the input voltage stored in the capacitor 21. The value of the capacitor 28 may be significantly smaller than of the capacitor 21.

When the transistor 23 is on, the transistor 24 is off and a difference of voltages stored in the capacitors 21 and 28 is applied across the primary. Subsequently, the transistors 23 and 24 are turned off and on respectively. The voltage stored in the capacitor 28 is applied across the primary. Therefore, the transistors 23 and 24 are switched so that voltages of opposite polarities are successively applied across the primary of the transformer 27. DC current flowing thru the capacitor 28 is substantially equal zero so that the DC voltage thereacross remains essentially unchanged. However, slow changes of the voltage across the capacitor 21 take place and so the DC voltage of the capacitor 28 varies accordingly.

The secondary of the transformer 27 is electromagnetically coupled to the primary and, in general, provides the output signal of the SPS. The diodes 41 and 42 have anodes coupled to the secondary for rectifying a voltage appearing thereat and providing an output current. The inductor 43 is coupled to cathodes of the diodes 41 and 42 for limiting the output current and reducing output voltage ripple. The capacitor 44 is coupled to the inductor 43 and a center-tap of the secondary for storing the output voltage of the SPS.

FIG. 3 is the embodiment of high power SPS according to the present invention with transformer having primary with grounded tap, e.g. center-tap. The input voltage is AC, e.g. line voltage. The diode bridge 30 is coupled in series with line for obtaining a fully rectified negative voltage. A capacitive means is coupled to ground for storing a positive DC voltage, thus having an opposite polarity to the rectified voltage. A switching means alternatively couples a node to the rectified voltage or DC voltage. An inductive means consists of the transformer 37 which is coupled to the node and ground for providing a charging signal and an output signal of the SPS. A rectifying means applies the charging signal to the capacitive means.

The capacitor 31 is coupled to the rectified voltage and ground for storing the peak value of the line voltage. The switching means includes a pair of switches coupled to the node and further separately coupled to the rectified voltage and DC voltage stored in the capacitors 31 and 32 respectively. Specifically, one switch consists of the n-channel MOSFET 33 and diode 35 coupled in parallel therewith. The other switch consists of the n-channel MOSFET 34 and diode 36 coupled in parallel therewith. The drain and source of the transistors 33 and 34 respectively are coupled to the node. The diodes 35 and 36 prevent reverse currents in the respective transistors and any voltage spikes at the node.

The capacitor 32 is coupled to ground. The primary of the transformer 37 has two windings coupled to the grounded tap. When the transistor 33 is on, the transistor 34 is off. The negative rectified voltage is applied across the winding which is coupled to the node. The voltage across the other winding is positive with reference to ground. This voltage is rectified and thus applied via the conducting diode 39 to the capacitor 32. The transformer 37 divides the current conducted by the transistor 33 into the charging current for capacitor 32 and output current provided by the secondary. The inductor 40 is coupled in series with the diode 39 for reducing a peak value of the charging current.

Subsequently, the transistors 33 and 34 are turned off and on respectively. The positive voltage stored in the capacitor 32 is applied across the winding which is coupled to the node. The voltage across the other winding of the primary is negative so that the diode 39 is reverse biased. The current conducted by the transistor 34 is transformed and provided by the secondary. By switching the transistors 33 and 34 voltages of opposite polarities are successively applied across the respective winding of the primary.

The components 41 thru 44 have the same reference numbers, perform the same functions and are coupled as in FIG. 2. The secondary of the transformer 37 is electromagnetically coupled to the primary and, in general, provides the output signal of the SPS. The diodes 41 and 42 have anodes coupled to the secondary for rectifying a voltage appearing thereat and providing an output current. The inductor 43 limits the output current and reduces output voltage ripple. The capacitor 44 is coupled to the inductor 43 and a tap of the secondary for storing the output voltage of the SPS.

The voltage across the capacitor 32 depends on the voltage across the capacitor 31 and turns ratio of primary windings of the transformer 37. The latter voltage is approximately equal to the peak of the line voltage. The voltage across the capacitor 32 can be significantly smaller as to reduce voltage ratings of the semiconductor devices, particularly transistors 33 and 34. Consequently, the turns ratio of secondary windings of the transformer 37 is the same as the primary ratio so that the diodes 41 and 42 provide substantially equal voltages.

A power factor correction circuit can be substituted for the full wave rectifiers 10, 20 and 30 of FIGS. 1, 2 and 3 respectively. Consequently, the capacitors 11, 21 and 31 of FIGS. 1, 2 and 3 respectively can be employed merely to prevent voltage spikes and thus have significantly reduced values. A correction circuit disclosed in the aforementioned "High Efficiency Power Factor Correction Circuit" filed herewith by the same inventor is recommended for a superior performance.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting input voltage into output signal, comprising:

a node;
a capacitive means coupled to ground for storing a DC voltage having an opposite polarity to the input voltage;
a switching means for successively applying the input voltage and DC voltage to the node;
a transformer means having a first winding coupled to the node and ground, a second winding coupled to ground for providing a charging signal and a third winding for providing the output signal; and
a rectifying means for applying the charging signal to the capacitive means.

2. Switching power supply of claim 1 wherein the switching means includes a pair of switches coupled to the node and further separately coupled to the input voltage and DC voltage.

3. Switching power supply of claim 2 wherein each switch includes a transistor and diode coupled in parallel therewith.

4. Switching power supply of claim 1 further including a diode means coupled to the third winding for rectifying a signal appearing thereat and providing the output signal.

5. Switching power supply of claim 4 further including an output capacitive means for storing the output signal.

6. Switching power supply of claim 1 further including a diode means coupled in series with the input signal for rectifying the input signal.

7. Switching power supply of claim 1 further including an input capacitive means coupled to the input signal and ground for storing the input signal.

8. Switching power supply of claim 1 further including an inductive means coupled in series with the rectifying means for reducing a peak value of the charging signal.

* * * * *